(No Model.)
C. BREUILLARD.
INHALER AND RESPIRATOR.
No. 399,736. Patented Mar. 19, 1889.
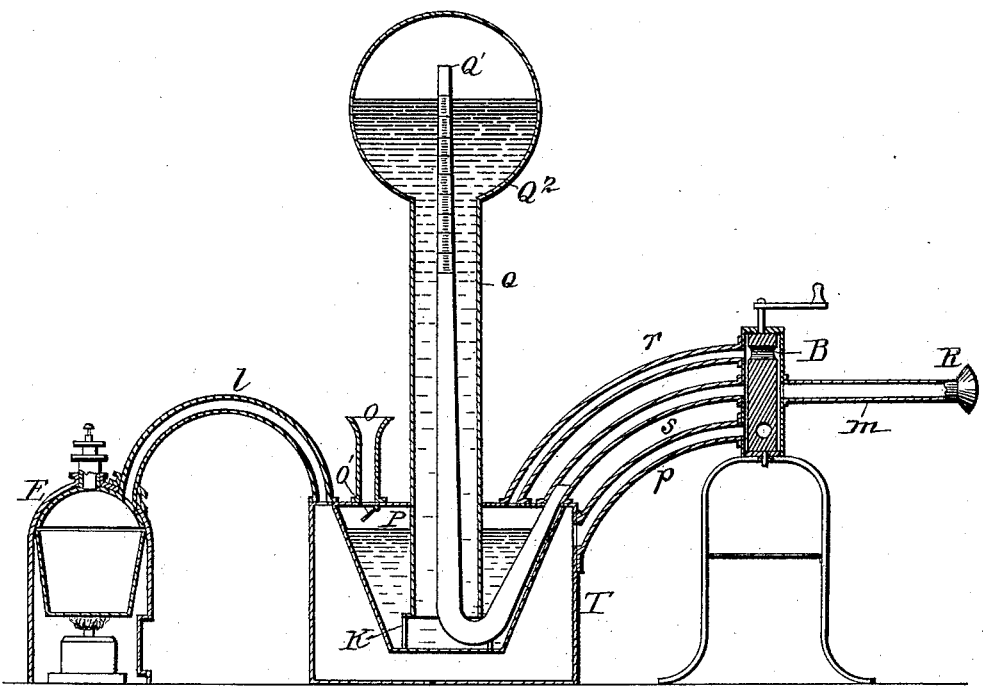
Witnesses,
Thomas Dunkerley
Thos. A. Foulkes.
Inventor
Charles Breuillard.
by Ferdinand Bosshardt.
Attorney.

UNITED STATES PATENT OFFICE.

CHARLES BREUILLARD, OF PARIS, FRANCE.

INHALER AND RESPIRATOR.

SPECIFICATION forming part of Letters Patent No. 399,736, dated March 19, 1889.

Application filed August 29, 1887. Serial No. 248,230. (No model.) Patented in France May 2, 1885, No. 168,654.

*To all whom it may concern:*

Be it known that I, CHARLES BREUILLARD, doctor of medicine, a citizen of the French Republic, and a resident of Paris, in the said French Republic, have invented new and useful Improvements in Inhalers and Respirators, (for which Letters Patent were granted in France, May 2, 1885, No. 168,654,) of which the following is a specification.

My invention relates to improvements in aero-therapeutical apparatus for promoting respiration and for other purposes, and has for its object to obtain at the same time an automatic inhalation, as well as an automatic exhalation. I attain this object by the apparatus illustrated in the accompanying drawing, which represents a vertical cross-section thereof.

Similar letters refer to similar parts throughout the view.

The vessel P, in which water is poured, is surrounded by an air-chamber, T, and has fixed in it a tube, Q, surmounted by a globe, $Q^2$, all of glass, and supported on the bottom by feet K. At the center of the tube Q is placed a vacuum-gage, $Q'$, of glass or any other suitable material, open at the top. The air-chamber T, by means of the pipe $l$, communicates with the vacuum apparatus E and the tube $m$ by means of the pipe $p$, which conducts rarefied air, valve B, and mouth-piece R, which latter is applied to the mouth or nose and serves for inhalation and exhalation. Between the said tubes $m$ and $p$ the valve B is interposed, establishing communication with the pipe $m$ or mouth-piece R and the vacuum apparatus E, or the pressure produced therein.

The vessel P is brought in communication with the valve B, pipe $m$, and mouth-piece R by means of the pipe $r$, which conducts compressed air, and the pipe $Q'$ by means of the pipe $s$, which serves for the return of the air into $Q'$ in order to permit the water to descend.

$o$ is an inlet communicating with the vessel P and atmosphere, and is provided with a valve, $o'$, which closes when the water descends in the tube Q and rises in the vessel P. The vacuum forms itself through the pipe $l$ and the gage $Q'$ in the top of the globe Q. The water rises and produces at the same time an aspiration in the tube $m$, which causes an exhalation. Afterward the air descends, and while the valve B is closed produces through pipe $r$, with open valve B, an inhalation by forcing back the air which has taken the place of the water in the vessel P.

This apparatus may be made and applied in different forms, and the inlet-pipes may be joined to the vessel P by the communication $o$, for the purpose of facilitating and producing the inhalation under pressure of medicinal vapors or gas from mineral waters.

Having now particularly described and ascertained the nature of this invention and in what manner the same is to be performed, I declare that what I claim as my invention, and desire to secure by Letters Patent, is—

The combination of the vessel P, arranged in the chamber T and provided with an inlet, $o$, having a valve, $o'$, globular pipe Q, and vacuum source E by means of the pipe $l$, and a mouth-piece, R, by means of the pipes $r$, $s$, $p$, and $m$, and valve B, substantially as and for the purpose specified.

In testimony that I claim the foregoing I have hereunto set my hand this 23d day of July, 1887.

CHARLES BREUILLARD.

Witnesses:
G. RADTEIR,
G. ANTHONIS, Jr.